T. F. WILSON.
BRACKET FOR LICENSE PLATES.
APPLICATION FILED MAR. 20, 1913.
1,093,515.
Patented Apr. 14, 1914.
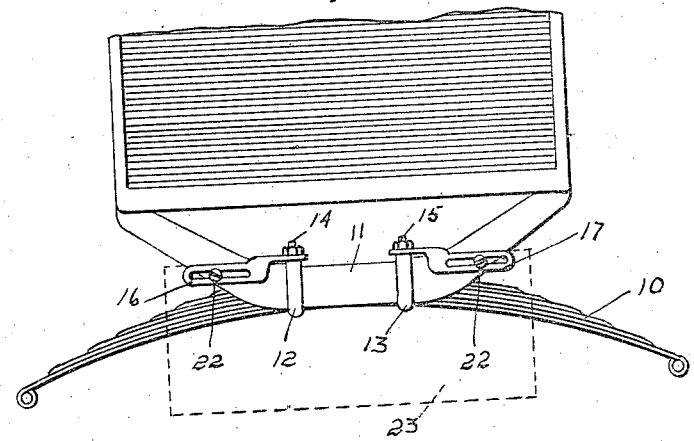
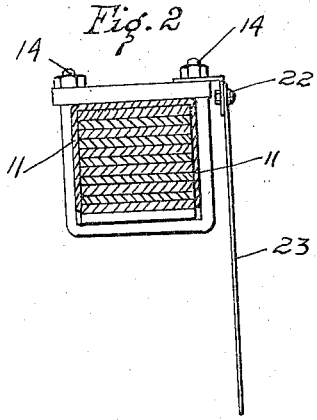
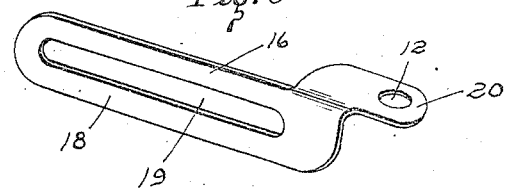
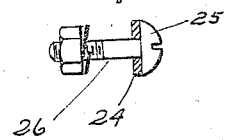
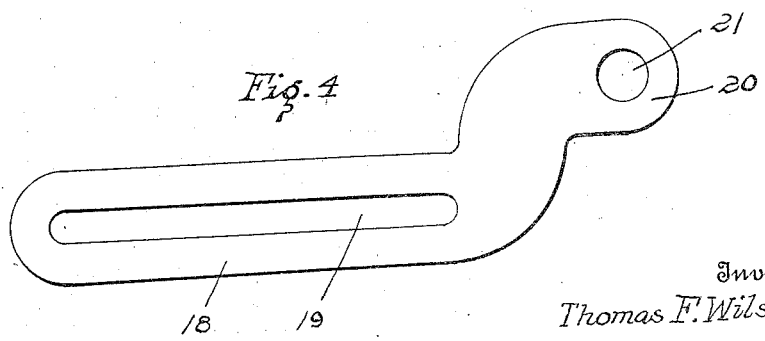
Inventor
Thomas F. Wilson
Witnesses
John F. Cavanagh
R. I. Ogden
By Howard E. Barlow
Attorney

UNITED STATES PATENT OFFICE.

THOMAS FORD WILSON, OF PROVIDENCE, RHODE ISLAND.

BRACKET FOR LICENSE-PLATES.

1,093,515.

Specification of Letters Patent.

Patented Apr. 14, 1914.

Application filed March 20, 1913. Serial No. 755,602.

*To all whom it may concern:*

Be it known that I, THOMAS F. WILSON, a citizen of the United States, and resident of the city of Providence, in the county of Providence and State of Rhode Island, have invented certain new and useful Improvements in Brackets for License-Plates, of which the following is a specification.

This invention relates to brackets for supporting license number display plates for road vehicles.

One of the objects of the invention is to provide a bracket for this purpose that may be struck up and formed completely of sheet metal by a single operation whereby the bracket is very strong and durable yet light in weight and neat and attractive in appearance, the expense of manufacture being thus reduced to the minimum.

A further object of the invention is to provide a bracket of this character particularly adapted to be secured in position by the yoke members which are employed in a certain style of automobile for clamping or binding together the transverse forward spring and the cross member of the frame, whereby one end of the bracket may be bound beneath the securing nut on the forward end of a yoke to firmly and securely retain the bracket in position without extra drilling, use of extra bolts, or other fastenings, employing only such fastenings as are already a part of the construction of the vehicle, and by which fastening to support the number plate in the most advantageous and desirable poistion on the vehicle and in such manner as to fully comply with all of the legal requirements.

With these and other objects in view, the invention consists of certain novel features of construction, as will be more fully described and particularly pointed out in the appended claim.

Of the accompanying drawings: Figure 1— is a front elevation showing a part of an automobile and my improved brackets attached to the yoke members which are employed in the construction of the vehicle, showing the number plate in dotted lines.
Fig. 2— is a transverse section showing a portion of the vehicle frame and spring which are bound together by means of a yoke member and my improved bracket bound in position beneath the nut at one end of said yoke member. Fig. 3— is an enlarged perspective view showing one of my improved bracket members. Fig. 4— is a plan view showing the member as it appears when struck from sheet stock. Fig. 5— is a detail showing the bolt for fastening the number plate to the bracket, the same being provided with a cushion washer beneath its end to prevent cracking the enamel on the number plate.

My improved bracket for supporting the number plate is particularly adapted for use on a certain type of automobile, having in its construction a forward transverse spring 10 which is clamped to a cross member 11 of the frame, said cross member having a hollow center portion to receive said spring, and the spring and frame at this point are bound together by two yoke members 12 and 13 which are provided with threaded ends 14 and 15 onto which nuts are screwed for securely binding these parts together.

My improved bracket members 16 and 19 are each preferably constructed of sheet metal being originally struck from sheet stock into the form illustrated in Fig. 4, each having an elongated plate-like body 18 provided with a longitudinal slot 19 and an upper flat supporting portion 20 extending beyond one end of said body and provided with a hole 21 of a size sufficient to receive the threaded end of its yoke. The supporting portion 20 extends rearwardly in a plane which is substantially at right angles to that of the body portion 18 so that when applied to the yoke and bound in position by the nut thereon the plane of the body portion will be vertically disposed and in position to receive the binding bolts 22 which extend through the holes in the upper edge of the number plate 23. Thus the longitudinal edges of the body 18 of the supporting portion 20 are substantially parallel, said body and said supporting portion being united by a bend in line with the upper longitudinal edge of said body 18, the front edge of said supporting portion being substantially in alinement with said bent and with the top longitudinal edge of the body. In practice I employ two bracket members 16, 17 to support a single number plate, whereby the necessity of accurately drilling or punching the holes for receiving the yoke ends 14 and 15 is eliminated and the stock which would be obliged to extend between these yokes if the whole were made in one piece is saved. Then again, by this construction there is positively no chance for these brackets to get out of line with each other as the outer end of each is secured to the number plate which holds the brackets rigidly in alined position.

In order to eliminate the objection of binding a bolt head directly against the finished or enamel surface of one plate I have, as illustrated in Fig. 5, provided a flexible washer 24 beneath the head 25 of the number plate bolt 26 whereby when this bolt is positioned this cushion washer will come in contact with and be bound tightly against the finished surface of this plate without injuring the same.

I claim:

A number plate bracket comprising an elongated plate-like body provided with a longitudinal slot to receive a securing device, and an upper flat supporting portion extending beyond one end of said body, the longitudinal edges of said body and said supporting portion being substantially parallel, said supporting portion extending rearwardly in a plane at right angles to the plane of said body, said body and supporting portion being united by a bend in line with the upper longitudinal edge of said body, the front edge of said supporting portion being substantially in alinement with said bend and with the top longitudinal edge of said body, said supporting portion being perforated for the passage of securing means.

In testimony whereof I affix my signature in presence of two witnesses.

THOMAS FORD WILSON.

Witnesses:
HOWARD E. BALLOW,
E. I. OGDEN.